Patented Jan. 26, 1932

1,842,626

UNITED STATES PATENT OFFICE

ANTON OSSENBECK, OF COLOGNE-MULHEIM, ERNST TIETZE, OF COLOGNE/RHINE, AND GERHARD HECHT, OF ELBERFELD, GERMANY, ASSIGNORS TO WINTHROP CHEMICAL COMPANY, INC., OF NEW YORK, N. Y., A CORPORATION OF NEW YORK

IODO METHANE SULPHONIC ACID AND HOMOLOGUES THEREOF

No Drawing. Application filed December 16, 1930, Serial No. 502,854, and in Germany December 24, 1929.

The present invention relates to iodo methane sulphonic acid and its homologues and to salts thereof, more particularly to compounds having in form of the free acids the probable formula:—

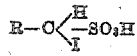

wherein R stands for hydrogen or an alkyl group, and to a process of preparing same.

In accordance with the present invention iodo methane sulphonic acid and its homologues, for example, methyl-, ethyl-, propyl- and butyl-iodo-methane sulphonic acid are prepared by reacting upon methylene iodide or a homologue thereof, corresponding to the general formula:—

wherein R stands for an alkyl group, with a neutral salt of the sulphurous acid, preferably in the presence of a diluent being inert to the starting materials under the conditions of the reaction. Advantageously the reaction is performed in an aqueous solution at elevated temperature, for example, on the water bath, while employing a water soluble salt of the sulphuric acid. Such salts are, for example, the ammonium-, alkali- and alkaline earth metal salts of the sulphurous acid, but also salts of the sulphurous acid with organic bases containing nitrogen, for example, methylamine-, diethylamine-, ethylenediamine-, piperidine- and piperazine sulphites may be used. When working in the above indicated manner, firstly a salt of the iodo methane sulphonic acid or of a homologue thereof is produced, the kind of salt being dependent on the kind of salt of the sulphurous acid used as reacting component. The free iodo methane sulphonic acid itself may be produced, for example, by digesting its sodium salt with strong hydrochloric acid and separating the precipitated sodium chloride in the customary manner. Thus the free iodo methane sulphonic acid is obtained as a sirupy liquid easily soluble in water and organic solvents, for example, alcohol and acetone. Of course, the iodo methane sulphonic acid or its homologues can be transformed into any desired salt according to the methods known per se. Alternatively a salt may be transformed into another salt according to the known process of double decomposition, for example, by salting out the calcium iodo methane sulphonate from a concentrated aqueous solution of sodium iodo methane sulphonate by the addition of calcium chloride or by reacting upon calcium iodo methane sulphonate, for example, with dimethylamine sulphate, thus producing the dimethylamine salt of the iodo methane sulphonic acid.

The salts of the iodo methane sulphonic acid and its homologues are for the greatest part soluble in water depending on the kind of the salt forming base used. The iodo methane sulphonic acid, its homologues and salts thereof may be used as intermediate products in chemical reactions. The water soluble salts have proved especially valuable as contrast media in the technique of X-ray pictures for rendering visible hollow bodies, especially the hollow organs of warm-blooded organisms, such as blood-vessels, articular cavities, fistulæ, urinary passages, the pelves of the kidneys, and the like. For example, in order to render the urinary passages visible the iodo methane sulphonic acid salt or a solution thereof can be introduced into the organism by one of the customary methods, and an X-ray photograph taken at or during the time the iodo methane sulphonic acid salt is excreted with the urine.

It may be mentioned that the iodo methane sulphonic acid and its homologues also have proved obtainable by reacting upon another halogen methane sulphonic acid, for instance, chloro- or bromo-methane sulphonic acid with a salt of hydro iodic acid, preferably an alkali or alkaline earth metal salt thereof.

The following examples illustrate the invention without restricting it thereto:—

*Example 1.*—50,4 parts by weight of crystallized sodium sulphite are dissolved in 200 parts by weight of water and the solution is strongly stirred with 54 parts by weight of methylene iodide for 8 hours at 70° C. The solution containing the sodium iodo methane sulphonate formed is evaporated to dryness.

The sodium iodide formed is extracted by means of acetone and the remaining residue of sodium iodo methane sulphonate is recrystallized from methyl alcohol. Thus well developed crystals of pure sodium iodo methane sulphonate in a yield of up to 95% of the theory are obtained. They decompose on heating in the dry state with liberation of iodine without melting in a characteristic manner. They dissolve in water with a neutral reaction and are soluble for example also in methyl alcohol and in dilute ethyl alcohol, but insoluble in ether, acetone, chloroform and petroleum ether. On treatment with nitrite in acid solution no iodine is liberated. From a concentrated aqueous solution of sodium iodo methane sulphonate the calcium salt can be salted out by means of calcium chloride.

The free acid can be obtained, for example, from the sodium salt by the addition of strong hydrochloric acid. It is a liquid, syrupy at room temperature, miscible in all proportions with water and alcohol.

*Example 2.*—54 grams of methylene iodide are shaken for 12 hours at 75° C. with 42,5 grams of crystallized magnesium sulphite in 200 ccs. of water and 20 ccs. of alcohol. After the separation of a little unchanged methylene iodide the solution is evaporated to dryness and the residue crystallized from a mixture of methyl alcohol and ether. There are obtained colorless crystals of the magnesium salt of iodo methane sulphonic acid, which are very readily soluble in water and of similar properties to the sodium salt already described.

*Example 3.*—When in Example 1 the sodium sulphite is replaced by the equivalent quantity of monomethylamine sulphite, obtainable by passing sulphur dioxide into an aqueous solution of monomethylamine and the process is carried out in a manner analogous to that described in Example 1, the monomethylamine salt of iodo methane sulphonic acid is obtained in colorless water soluble crystals, which melt at 144—745° C.

The same product is obtained, for example, by digesting 50 parts by weight of sodium iodo methane sulphonate for a short time with 100 parts by weight of concentrated hydrochloric acid, filtering from the separated sodium chloride, evaporating the excess hydrochloric acid completely at 100° C. and after dissolving in water the iodo methane sulphonic acid (which remains as a syrup), neutralizing with aqueous methylamine solution. The solution is evaporated until crystallization occurs and the separation is completed by the addition of a mixture of methyl alcohol and ether. After separation and drying the methylamine salt of iodo methane sulphonic acid is obtained as above in colorless crystals, which are readily soluble in water with a neutral reaction. The iodo methane sulphonic acid can likewise be neutralized with other organic and inorganic bases instead of with methylamine and the corresponding salts obtained in an analogous manner.

The salts of iodo methane sulphonic acid with other, for example, organic bases, such as dimethylamine, can also be obtained by causing the calcium iodo methane sulphonate, obtainable in accordance with Example 1, to act on an equimolecular quantity of dimethylamine sulphate in alcoholic aqueous solution, separating from precipitated calcium sulphate, evaporating to dryness and working up as in Example 1. Colorless crystals, readily soluble in water with a neutral reaction are thus obtained.

*Example 4.*—197,4 parts by weight of ethylidene iodide in 360 parts by weight of water are shaken at 95° C. for 48 hours in a closed vessel with 176,4 parts by weight of neutral sodium sulphite. The liquid after separation from a small quantity of unchanged ethylidene iodide is evaporated to dryness at a low temperature. The salt mixture remaining is extracted with acetone and the portion insoluble therein is crystallized from 3—4 parts of methyl alcohol. The sodium salt of alpha-iodoethane-alpha-sulphonic acid crystallizes in colorless lustrous leaflets, which dissolve readily in water with a neutral reaction.

We claim:—

1. As new products the compounds having in form of the free acids the probable formula:—

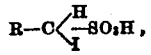

wherein R stands for hydrogen or an alkyl group, said products being in form of the acids sirupy liquids easily soluble in water and organic solvents, being valuable intermediate products, being in form of their water soluble salts valuable contrast media for X-ray photography.

2. As a new product the compound having in form of its free acid the formula:—

$$H_2CI—SO_3H,$$

said acid being a sirupy liquid easily soluble in water and organic solvents, being a valuable intermediate product, being in form of its water soluble salts a valuable contrast medium for X-ray photography.

3. The process which comprises reacting upon a compound of the probable formula:—

wherein R stands for hydrogen or an alkyl group, with a neutral salt of the sulphurous acid.

4. The process which comprises heating a compound of the probable formula:—

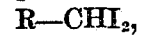

wherein R stands for hydrogen or an alkyl group, with a neutral salt of the sulphurous acid.

5. The process which comprises heating a compound of the probable formula:—

wherein R stands for hydrogen or an alkyl group, with a neutral salt of the sulphurous acid in the presence of a diluent inert to the starting materials.

6. The process which comprises heating a compound of the probable formula:—

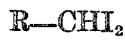

wherein R stands for hydrogen or an alkyl group, with a water soluble neutral salt of the sulphurous acid in the presence of water.

7. The process which comprises heating methylene iodide with a water soluble neutral salt of the sulphurous acid in the presence of water.

8. The process which comprises heating methylene iodide with an alkali metal salt of the sulphurous acid in the presence of water.

9. The process which comprises heating methylene iodide with an alkali metal salt of the sulphurous acid in the presence of water with stirring to about 70° C.

10. The process which comprises heating 50 parts by weight of sodium sulphite, 200 parts by weight of water and 54 parts by weight of methylene iodide at 70° C. during a period of 8 hours with strongly stirring, evaporating the reaction mixture to dryness, removing the sodium iodide formed by extraction with acetone and recrystallizing the residue obtained from methylalcohol.

In testimony whereof, we affix our signatures.

ANTON OSSENBECK.
ERNST TIETZE.
GERHARD HECHT.